US012298688B2

(12) United States Patent
Omori et al.

(10) Patent No.: US 12,298,688 B2
(45) Date of Patent: May 13, 2025

(54) TRANSFER BELT HAVING A SUBSTRATE LAYER THAT INCLUDES POLYESTER, SILICONE PARTICLES, AND CONDUCTIVE PARTICLES, TRANSFER DEVICE HAVING THE TRANSFER BELT, AND IMAGE FORMING APPARATUS HAVING THE TRANSFER DEVICE

(71) Applicant: FUJIFILM Business Innovation Corp., Tokyo (JP)

(72) Inventors: Kenji Omori, Kanagawa (JP); Shogo Hayashi, Kanagawa (JP); Jun Kimura, Kanagawa (JP); Masato Ono, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/355,521

(22) Filed: Jul. 20, 2023

(65) Prior Publication Data

US 2024/0288802 A1 Aug. 29, 2024

(30) Foreign Application Priority Data

Feb. 21, 2023 (JP) ................................ 2023-025487

(51) Int. Cl.
*G03G 15/20* (2006.01)
*G03G 15/16* (2006.01)

(52) U.S. Cl.
CPC .................. *G03G 15/1685* (2013.01); *G03G 2215/1623* (2013.01)

(58) Field of Classification Search
USPC ........................................................ 399/313
See application file for complete search history.

(56) References Cited

U.S. PATENT DOCUMENTS

2015/0160596 A1* 6/2015 Asaka .................. G03G 15/206 399/333
2017/0045845 A1* 2/2017 Ogura .................... G03G 15/16

FOREIGN PATENT DOCUMENTS

| | | | | | |
|---|---|---|---|---|---|
| CN | 104919375 | A | * | 9/2015 | ......... G03G 15/0189 |
| JP | 2018-112619 | A | | 7/2018 | |
| JP | 2019-117292 | A | | 7/2019 | |
| JP | 2020-086013 | A | | 6/2020 | |
| JP | 6800023 | B2 | | 12/2020 | |
| JP | 6929767 | B2 | | 9/2021 | |

* cited by examiner

*Primary Examiner* — Quana Grainger
(74) *Attorney, Agent, or Firm* — Sughrue Mion, PLLC

(57) ABSTRACT

A transfer belt includes a substrate layer that includes polyester, silicone particles, and conductive particles.

17 Claims, 1 Drawing Sheet

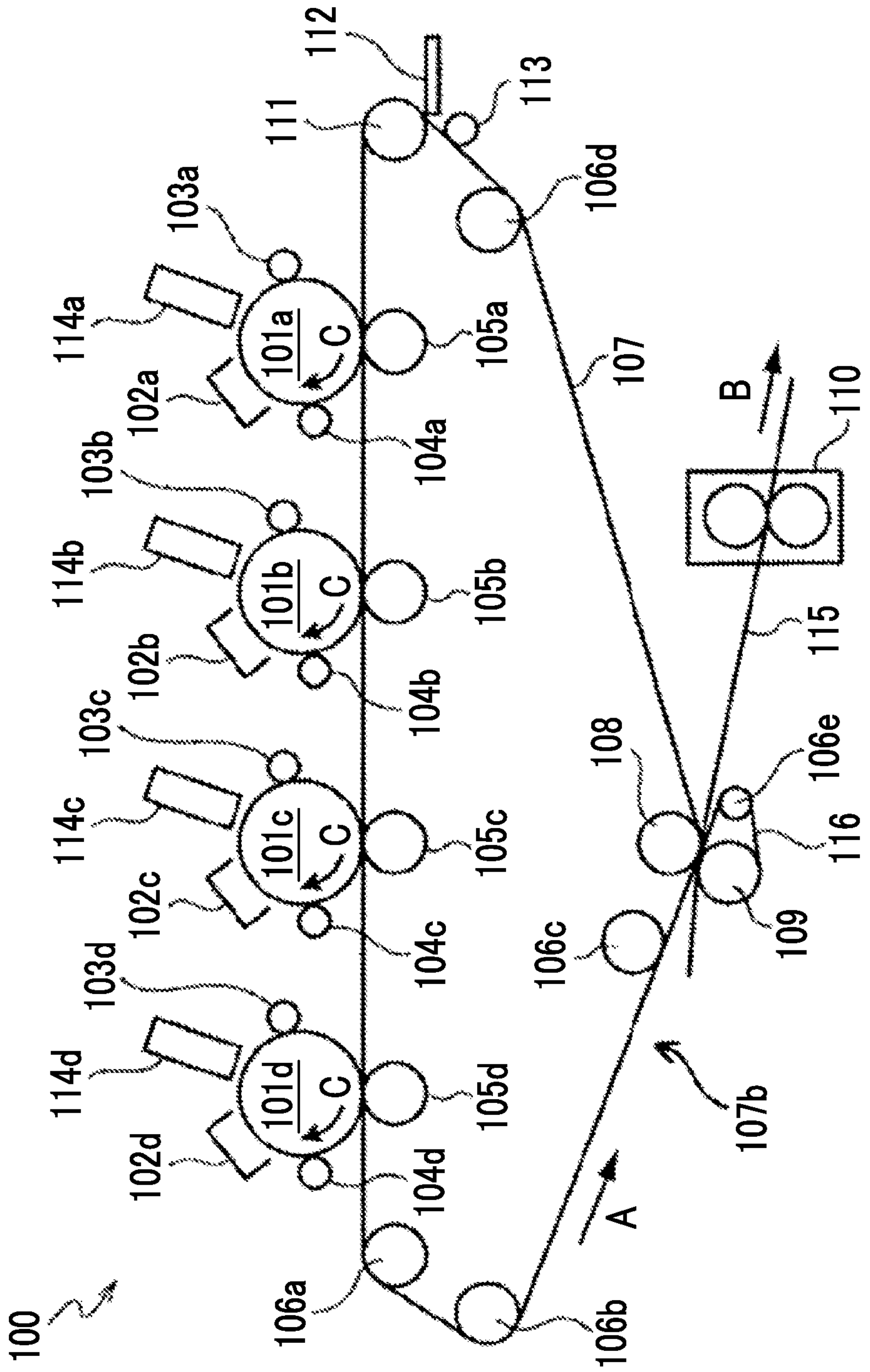
100
101a
101b
101c
101d
C
102a
102b
102c
102d
103a
103b
103c
103d
104a
104b
104c
104d
105a
105b
105c
105d
106a
106b
106c
106d
106e
107
107b
108
109
110
111
112
113
114a
114b
114c
114d
115
116
A
B

TRANSFER BELT HAVING A SUBSTRATE LAYER THAT INCLUDES POLYESTER, SILICONE PARTICLES, AND CONDUCTIVE PARTICLES, TRANSFER DEVICE HAVING THE TRANSFER BELT, AND IMAGE FORMING APPARATUS HAVING THE TRANSFER DEVICE

CROSS-REFERENCE TO RELATED APPLICATIONS

This application is based on and claims priority under 35 USC 119 from Japanese Patent Application No. 2023-025487 filed Feb. 21, 2023.

BACKGROUND

(i) Technical Field

The present invention relates to a transfer belt, a transfer device, and an image forming apparatus.

(ii) Related Art

In an image forming apparatus (such as a copying machine, a facsimile, or a printer) using an electrophotographic method, a toner image formed on a surface of an image holder is transferred to a surface of a recording medium and is fixed to the recording medium to form an image thereon. In order to transfer the toner image to the recording medium, for example, a conductive endless belt such as an intermediate transfer belt is used.

For example, JP2020-086013A discloses an intermediate transfer belt including a primer layer and a coat layer in this order on a substrate layer, in which the substrate layer includes a resin having a carbonyl group, the primer layer includes a silane coupling agent having a nitrogen atom, and the coat layer includes a compound having a structure represented by the following Formula (1).

Formula (1)

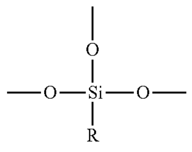

(In the formula, R represents a hydrogen atom, an oxygen atom, or an alkyl group having 10 or less carbon atoms).

JP2019-117292A discloses a transfer belt for an image forming apparatus including a surface layer that is formed of a resin composition including a silicone-acrylic copolymer resin and a urethane resin as a major component.

JP2018-112619A discloses a transfer belt for an image forming apparatus including a substrate layer and an elastic layer that are laminated, in which the substrate layer is formed of a composition including a polyamide resin (A) and a fine carbon fiber (B), and the elastic layer is formed of a composition including a thermoplastic elastomer (C) and ionic conductive agent (D).

SUMMARY

Aspects of non-limiting embodiments of the present disclosure relate to a transfer belt, a transfer device, and an image forming apparatus that include polyester and conductive particles, in which formation of white spots (that is, a phenomenon in which toner is not attached to portions of a recording medium surface where toner should be attached to form an image) is suppressed in an image that is formed after continuously forming images as compared to a case where silicone particles are not included.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

Means for addressing the above object include the following aspect.

According to an aspect of the present disclosure, there is provided a transfer belt including a substrate layer that includes polyester, silicone particles, and conductive particles.

BRIEF DESCRIPTION OF THE DRAWINGS

Exemplary embodiment(s) of the present invention will be described in detail based on the following FIGURE, wherein:

FIG. 1 is a schematic configuration diagram showing an example of an image forming apparatus according to an exemplary embodiment.

DETAILED DESCRIPTION

Hereinafter, an exemplary embodiment will be described. The following description and examples are merely exemplary of the present exemplary embodiment, and do not limit the scope of the present exemplary embodiment.

An upper limit value or a lower limit value described in one numerical range described in a stepwise manner in the present exemplary embodiment may be replaced with an upper limit value or a lower limit value in another numerical range described in a stepwise manner. In addition, an upper limit value or a lower limit value in a numerical range described in the present exemplary embodiment may be replaced with a value described in Examples.

In the present exemplary embodiment, the term "step" includes not only an independent step but also a step that cannot be clearly distinguished from other steps but can achieve the expected object thereof.

In the present exemplary embodiment, in a case where an exemplary embodiment is described with reference to drawings, the configuration of the present exemplary embodiment is not limited to the configuration shown in the drawings. In addition, the sizes of members in each of the drawings are conceptual and do not limit the relative relationship between the sizes of the members.

In the present exemplary embodiment, each of components may include a plurality of corresponding materials. In a case where plural kinds of materials corresponding to each of components in a composition are present in the present exemplary embodiment, unless specified otherwise, the amount of each of the components in the composition refers to the total amount of the plural kinds of materials present in the composition.

Transfer Belt

A transfer belt according to the present exemplary embodiment includes: a substrate layer that includes polyester, silicone particles, and conductive particles.

In addition, the transfer belt according to the present exemplary embodiment is used as an intermediate transfer belt.

Conductivity in the present specification represents that a volume resistivity at 20° C. is less than $1\times10^{13}$ Ω·cm.

In an image forming apparatus using an electrophotographic method, charges are formed on an image holder consisting of a photoconductive photoreceptor, an electrostatic latent image is formed with laser light modulated from an image signal, and the electrostatic latent image is developed with charged toner to be visualized as a toner image. For example, an image forming apparatus that electrostatically transfers the toner image through an intermediate transfer member to obtain a reproduced image is disclosed. As a material of the intermediate transfer member used in the image forming apparatus adopting the intermediate transfer member type, the use of a polycarbonate resin, a conductive endless belt including a thermoplastic resin such as polyvinylidene fluoride or polyamide, a polyimide resin, or a polyamide imide resin is disclosed.

In addition, the electrostatic transfer properties are improved by imparting conductivity to the above-described resin, and as a conductive material that imparts conductivity, carbon black, an ionic conductive resin, or a conductive polymer is used.

In the transfer belt formed of the above-described material, the occurrence of filming (transfer belt surface cleaning failure) caused by an external additive of toner or paper powder of paper as a medium that is used in the intermediate transfer type image forming apparatus during repeated use, the occurrence of unevenness (image failure) caused by transfer belt surface abrasion due to a change in resistance of the transfer belt or contact with another member during long-term use, and deformation caused by moisture absorption in a high humidity (image failure caused by deformation of the transfer belt) occur. As a result, formation of white spots occurs in an image that is formed after continuously forming images.

The transfer belt according to the present exemplary embodiment includes: a substrate layer that includes polyester, silicone particles, and conductive particles. As a result, formation of white spots (that is, a phenomenon in which toner is not attached to portions of a recording medium surface where toner should be attached to form an image) is suppressed in an image that is formed after continuously forming images.

The reason for this is presumed as follows. By forming the transfer belt using the material obtained by adding the silicone particles to the polyester, the polyester has excellent abrasion resistance, and scratches caused by surface abrasion during repeated use are suppressed as compared to other thermoplastic resins. However, by adding the silicone particles having low friction to impart lubricating properties, and low frictional properties are imparted to excellent mechanical strength. As a result, stress load generated during contact with another member or the like is reduced, and surface abrasion resistance is improved.

Regarding the stability of electrical properties, the following is presumed. Since conductive particles having a small particle diameter are dispersed with a high density in the transfer belt, the migration distance of electrons is reduced. Therefore, a conductive path in which stable electron migration can be performed for a short electron migration time can be formed.

Regarding the dimension stability with respect to moisture absorption, it is presumed that the stiffening effect obtained by dense dispersion of the conductive particles and the water repellent effect obtained by uniform dispersion of the silicone particles work synergistically such that deformation is suppressed.

It is presumed that contamination resistance of the surface with respect to toner or paper powder is obtained as follows. The surface energy is reduced by the silicone particles and an attachment force of the toner or the paper powder to the belt surface is weakened such that a mechanical cleaning force by a cleaning unit such as a cleaning blade works effectively.

Due to the principle (mechanism) described above, the stability of physical properties in the transfer belt can be obtained, and a transfer belt in which formation of white spots is suppressed in an image that is formed after continuously forming images can be obtained.

The transfer belt according to the present exemplary embodiment may include only the substrate layer or may include the substrate layer and a surface layer provided on the substrate layer. From the viewpoint of further exhibiting the effects of the present exemplary embodiment, for example, it is preferable that the transfer belt includes only the substrate layer. In addition, the transfer belt according to the present exemplary embodiment may include another well-known layer between the substrate layer and the surface layer or on one surface of the substrate layer.

Substrate Layer

The substrate layer in the transfer belt according to the present exemplary embodiment includes polyester, silicone particles, and conductive particles.

Polyester

The polyester used in the present exemplary embodiment is not particularly limited, and examples thereof include a well-known polyester resin.

Examples of the polyester include a polycondensate of a polycarboxylic acid and a polyhydric alcohol. As the polyester resin, a commercially available product or a synthetic resin may be used.

In addition, in the substrate layer the polyester may be used alone or in combination of two or more kinds.

Examples of the polycarboxylic acid include an aliphatic dicarboxylic acid (for example, oxalic acid, malonic acid, maleic acid, fumaric acid, citraconic acid, itaconic acid, glutaconic acid, succinic acid, alkenyl succinic acid, adipic acid, or sebacic acid), an alicyclic dicarboxylic acid (for example, cyclohexanedicarboxylic acid and the like), an aromatic dicarboxylic acid (for example, terephthalic acid, isophthalic acid, phthalic acid, or naphthalenedicarboxylic acid), an anhydride thereof, and a lower alkyl ester (for example, having 1 or more and 5 or less carbon atoms) thereof. Among these, for example, an aromatic dicarboxylic acid is preferable as the polycarboxylic acid.

As the polycarboxylic acid, a tri- or higher carboxylic acid that has a crosslinked structure or a branched structure may be used in combination with a dicarboxylic acid. Examples of the tri- or higher carboxylic acid include trimellitic acid, pyromellitic acid, an anhydride, and a lower alkyl ester (for example, having 1 or more and 5 or less carbon atoms) thereof.

The polycarboxylic acid may be used alone or in combination of two or more kinds.

Examples of the polyhydric alcohol include an aliphatic diol (for example, ethylene glycol, diethylene glycol, triethylene glycol, propylene glycol, butanediol, hexanediol, or neopentyl glycol), an alicyclic diol (for example, cyclohexanediol, cyclohexanedimethanol, or hydrogenated bisphenol A), and an aromatic diol (for example, an ethylene oxide adduct of bisphenol A or a propylene oxide adduct of bisphenol A). Among these, as the polyhydric alcohol, for example, an aromatic diol or an alicyclic diol is preferable, and an aromatic diol is more preferable.

As the polyhydric alcohol, a trihydric or higher polyhydric alcohol having a crosslinked structure or a branched structure may be used in combination with a diol. Examples of the trihydric or higher polyhydric alcohol include glycerin, trimethylolpropane, and pentaerythritol.

The polyhydric alcohol may be used alone or in combination of two or more kinds.

The weight-average molecular weight (Mw) of the polyester is, for example, preferably 5,000 or more and 1,000,000 or less, and more preferably 7,000 or more and 500,000 or less.

The number-average molecular weight (Mn) of the polyester is, for example, preferably 2,000 or more and 100,000 or less.

The molecular weight distribution Mw/Mn of the polyester is, for example, preferably 1.5 or more and 100 or less, and more preferably 2 or more and 60 or less.

The weight-average molecular weight and the number-average molecular weight are measured by gel permeation chromatography (GPC). In the measurement of the molecular weight is by GPC, GPC·HLC-8120GPC manufactured by Tosoh Corporation is used as a measuring device, TSKgel Super HM-M (15 cm) manufactured by Tosoh Corporation is used as a column, and tetrahydrofuran (THF) is used as a solvent. The weight-average molecular weight and the number-average molecular weight are calculated using a molecular weight calibration curve plotted using a monodispersed polystyrene standard sample from the measurement results.

In particular, as the polyester, for example, polyester including an aromatic group is preferable, polyalkylene terephthalate is more preferable, and polyethylene terephthalate or polybutylene terephthalate is still more preferable from the viewpoint of suppressing the formation of image white spots, and polybutylene terephthalate is still more preferable from the viewpoint of simultaneously achieving strength and toughness.

In addition, from the viewpoint of suppressing the formation of image white spots, the content of polybutylene terephthalate in the polyester, for example, with respect to the total mass of the polyester is preferably 80 mass % or more, more preferably 90 mass % or more, and still more preferably 95 mass % or more and 100 mass % or less.

Silicone Particles

The substrate layer includes silicone particles.

The silicone particles in the present exemplary embodiment are particles including a silicone resin.

The content of the silicone resin in the silicone particles, for example, with respect to the total mass of the silicone particles is preferably 80 mass % or more, more preferably 90 mass % or more, and still more preferably 95 mass % or more and 100 mass % or less.

In the present exemplary embodiment, the silicone resin refers to all of general silicone resins, and examples thereof include a straight silicone resin consisting of an organosiloxane bond, a silicone resin modified with an alkyd, polyester, an epoxy, an acryl, or a urethane, and a silicone resin having a crosslinked structure (for example, silicone rubber).

Specific examples of the silicone resin include: a silicone resin such as a methyl silicone resin having a methyl group or a phenyl group at a side chain, a phenyl silicone resin, or a methyl phenyl silicone resin; a crosslinked silicone resin obtained by forming a crosslinked structure on the silicone resin; and a modified silicone resin obtained by chemically bonding another organic resin to the silicone resin.

Specific examples of the modified silicone resin include a modified silicone resin modified with a fluorine-based resin, an acrylic resin, an epoxy resin, a polyester resin, a fluorine acrylic resin, an acrylic styrene resin, an alkyd resin, a urethane resin, or the like and a crosslinked fluorine modified silicone resin.

In particular, as the silicone particles, from the viewpoints of obtaining abrasion resistance and suppressing the formation of image white spots, for example, particles including a silicone resin having a three-dimensional crosslinked structure are preferable, and core-shell particles including a core portion and a shell portion are more preferable, the core portion including a silicone resin not having a three-dimensional crosslinked structure (that is, silicone rubber (silicone elastomer) having a two-dimensional crosslinked structure consisting of a siloxane bond), and the shell portion coating the core portion and including a silicone resin having a three-dimensional crosslinked structure (silicone resin having a three-dimensional crosslinked structure consisting of a siloxane bond).

From the viewpoint of suppressing the formation of image white spots, for example, the average primary particle diameter of the silicone particles is preferably as small as possible in manufacturing handleability, and the upper limit thereof is preferably 50 μm or less, more preferably 30 μm or less, and still more preferably 10 μm or less.

The average primary particle diameter of the silicone particles is measured using the following method. First, a measurement sample having a thickness of 100 nm is collected from each of the layers in the obtained belt using a microtome and is observed with a transmission electron microscope (TEM). Then, the diameter of a circle equivalent to each of projected areas of 50 conductive particles (that is, an equivalent circle diameter) is obtained as a particle diameter, and the average value thereof is obtained as a number average primary particle diameter.

In addition, the shape of the silicone particles is not particularly limited and is preferably spherical.

The substrate layer may include one kind of silicone particles alone or may include two or more kinds of silicone particles.

From the viewpoint of suppressing the formation of image white spots, in a case where a content of the polyester is set to 100 parts by mass, the content of the silicone particles in the substrate layer is, for example, preferably 0.1 parts by mass or more and 50 parts by mass or less, more preferably 1 part by mass or more and 30 parts by mass or less, still more preferably 2 parts by mass or more and 25 parts by mass or less, and still more preferably 3 parts by mass or more and 20 parts by mass or less.

Conductive Particles

The substrate layer includes conductive particles.

Examples of the conductive particles include carbon black such as Ketjen black, oil furnace black, channel black, or acetylene black; metal particles such as aluminum or nickel; and metal oxide particles such as indium tin oxide, tin oxide, zinc oxide, titanium oxide, or yttrium oxide.

From the viewpoints of suppressing image color loss and the formation of color spots, as the conductive particles, for example, particles of a carbon material are preferable, and carbon black is more preferable.

The number average primary particle diameter of the conductive particles is, for example, preferably 50 nm or less, more preferably 40 nm or less, and still more preferably 30 nm or less.

The average primary particle diameter of the conductive particles is measured using the following method.

First, a measurement sample having a thickness of 100 nm is collected from each of the layers in the obtained belt using a microtome and is observed with a transmission electron microscope (TEM). Then, the diameter of a circle equivalent to each of projected areas of 50 conductive particles (that is, an equivalent circle diameter) is obtained as a particle diameter, and the average value thereof is obtained as an average primary particle diameter.

A method of measuring the volume resistance in the particles used in the present exemplary embodiment is as follows.

Particles (external additive) to be measured are placed flat on a surface of a circular jig where a 20 $cm^2$ electrode plate is disposed. The same 20 $cm^2$ electrode plate as described above is placed on the particles such that the particle layer is sandwiched between the electrode plates. In order to eliminate voids between the particles, a load of 4 kg is applied to the electrode plates, and then the thickness (cm) of the particle layer is measured. Both the upper and lower electrodes of the carrier layer are connected to an electrometer and a high-voltage power supply device. By applying a high voltage to both of the electrodes such that an electric field is a predetermined value and reading a current value (A) flowing at this time, the volume resistivity (Ω·cm) of the particles is calculated. A calculation formula of the volume resistivity of the particles (Ω·cm) is calculated as shown in the following Formula (3).

$$\rho = E \times 20/(I - I0)/L \qquad \text{Formula (3)}$$

In the formula, ρ represents a volume resistivity (Ω·cm) of the particles, E represents the applied voltage (V), I represents the current value (A), $I_0$ represents the current value (A) at an applied voltage of 0 V, and L represents the thickness (cm) of the carrier layer. In addition, the coefficient 20 represents the area ($cm^2$) of the electrode plate.

In the substrate layer, the conductive particles may be used alone or in combination of two or more kinds.

From the viewpoint of suppressing the formation of image white spots, in a case where a content of the polyester is set to 100 parts by mass, the content of the conductive particles in the substrate layer is, for example, preferably 5 parts by mass or more and 50 parts by mass or less, more preferably 10 parts by mass or more and 45 parts by mass or less, still more preferably 15 parts by mass or more and 40 parts by mass or less, and still more preferably 25 parts by mass or more and 35 parts by mass or less.

From the viewpoint of suppressing the formation of image white spots, a mass ratio Mc/Ms of a content Mc of the conductive particles to a content Ms of the silicone particles in the substrate layer is, for example, preferably 0.2 or more and 50 or less, more preferably 0.5 or more and 30 or less, still more preferably 1 or more and 20 or less, and still more preferably 1.5 or more and 5 or less.

In addition, from the viewpoint of suppressing the formation of image white spots, for example, it is preferable that the content of the conductive particles is more than the content of the silicone particles in the substrate layer.

Other Components

The substrate layer may include other components in addition to the polyester, the silicone particles, and the conductive particles.

Examples of the other components include a conductive agent other than the conductive particles, a filler for improving the strength of the belt, an antioxidant for preventing thermal deterioration of the belt, a surfactant for improving fluidity, a heat aging inhibitor, a crosslinking agent, a flame retardant, a colorant, and a dispersant.

In a case where the substrate layer includes other components, the content of the other components with respect to the total mass of the substrate layer is, for example, preferably more than 0 mass % and 10 mass % or less, more preferably more than 0 mass % and 5 mass % or less, and still more preferably more than 0 mass % and 1 mass % or less.

The substrate layer may include a conductive agent other than the conductive particles. Examples of the conductive agent include: an ion conductive material such as potassium titanate, potassium chloride, sodium perchlorate, or lithium perchlorate; and an ion conductive polymer such as polyaniline, polyether, polypyrrole, polysulfone, or polyacetylene. The conductive agent may be used alone or in combination of two or more kinds.

The thickness of the substrate layer is, for example, preferably 50 μm or more and 500 μm or less, more preferably 60 μm or more and 400 μm or less, and still more preferably 80 μm or more and 200 μm or less.

Surface Resistivity of Transfer Belt

From the viewpoint of improving transfer properties to embossed paper, a common logarithmic value of the surface resistivity in a case where a voltage of 500 V is applied to the outer peripheral surface of the transfer belt for 3 seconds is, for example, preferably 8 (log Ω/sq.) or more 15.0 (log Ω/sq.) or less, more preferably 8.5 (log Ω/sq.) or more and 14.0 (log Ω/sq.) or less, and still more preferably 9.0 (log Ω/sq.) or more and 13.5 (log Ω/sq.) or less.

The unit log Ω/sq. of the surface resistivity represents the surface resistivity using the logarithmic value of the resistance value per unit area, which is also written as log(Ω/sq.), log Ω/square, log Ω/□, or the like.

The measurement of the surface resistivity in a case where a voltage of 500 V is applied to the outer peripheral surface of the endless belt for 3 seconds is performed using the following method.

By using a microammeter (R8430A manufactured by ADVANTEST CORPORATION) as a resistance meter and a UR probe (manufactured by Mitsubishi Chemical Analytech Co., Ltd.) as a probe, the surface resistivity (log Ω/sq.) of the outer peripheral surface of the endless belt is measured at 18 points in total including 6 points at regular intervals in the peripheral direction and 3 points at each of the center portion and both end portions in the width direction at a voltage of 500 V under a pressure of 1 kgf for an application time of 3 seconds, and the average value thereof is calculated. The surface resistivity is measured in an environment of a temperature of 22° C. and a humidity of 55% RH.

Method of Manufacturing Transfer Belt

A method of manufacturing the transfer belt is not particularly limited.

In one example of the method of manufacturing the transfer belt, for example, the polyester, the conductive particles, and the silicone particles are kneaded using a twin screw melt extruder/kneader such that the amount of each of the components is a predetermined mixing amount. As a result, a mixed pellet is obtained.

This pellet is heated to a resin melting temperature (melting point) or higher using a single screw melt extruder and is melt-extruded into a cylindrical shape. Next, an inner peripheral surface of the molten resin that is melt-extruded into a cylindrical shape is brought into contact with an outer surface of a cylindrical inner sizing die to be cooled, the outer peripheral surface of and the molten resin that is extruded into a cylindrical shape is blown with cooling air to be cooled and solidified, and is subsequently cut. As a result, a cylindrical transfer belt is obtained.

Transfer Device and Image Forming Apparatus

A transfer device according to the present exemplary embodiment is not particularly limited as long as the transfer device includes the transfer belt according to the present exemplary embodiment. For example, it is preferable that the transfer device according to the present exemplary embodiment is a transfer device including: an intermediate transfer belt that includes the transfer belt according to the present exemplary embodiment; a primary transfer device that primarily transfers a toner image formed on a surface of an image holder to an outer peripheral surface of the intermediate transfer belt; and a secondary transfer device that secondarily transfers the toner image transferred to the outer peripheral surface of the intermediate transfer belt to a recording medium.

An image forming apparatus according to the present exemplary embodiment is not particularly limited as long as the transfer device includes the transfer belt according to the present exemplary embodiment. For example, it is preferable that the image forming apparatus according to the present exemplary embodiment includes the transfer device according to the present exemplary embodiment.

Examples of an aspect of the image forming apparatus to which the transfer belt according to the present exemplary embodiment is applied include the following aspect.

Specifically, the image forming apparatus includes: an image holder; a charging device that charges a surface of the image holder; a latent image forming device that forms an electrostatic latent image on the image holder charged by the charging device; a developing device that develops the electrostatic latent image formed on the image holder with toner to form a toner image; an intermediate transfer belt that is formed of an annular body according to the present exemplary embodiment; a primary transfer device that transfers the toner image on the image holder to the annular body for intermediate transfer; a secondary transfer device that transfers the toner image transferred to the intermediate transfer belt to a recording medium; and a fixing device that fixes the toner image on the recording medium.

In the transfer belt according to the present exemplary embodiment including the above-described image forming apparatus, for example, the surface resistivity is preferably $1\times10^6$ Ω/□ or more and $1\times10^{12}$ Ω/□ or less.

Examples of the image forming apparatus according to the present exemplary embodiment include a normal monochrome image forming apparatus that contains only a monochromatic toner in a developing device, a color image forming apparatus that sequentially repeats primary transfer of a toner image held on an image holder to an intermediate transfer belt, and a tandem color image forming apparatus in which a plurality of image holders including developing units of respective colors are disposed in series on an intermediate transfer belt.

Hereinafter, an exemplary embodiment where the transfer belt according to the present exemplary embodiment is used as an intermediate transfer belt will be described with reference to the drawings.

FIG. 1 is a schematic diagram showing an example (one exemplary embodiment) of a configuration of the image forming apparatus according to the present exemplary embodiment. An image forming apparatus 100 in FIG. 1 is, for example, a so-called tandem type, in which charging devices 102*a* to 102*d*, exposure devices 114*a* to 114*d*, developing devices 103*a* to 103*d*, primary transfer devices (primary transfer rollers) 105*a* to 105*d*, and image holder cleaning devices 104*a* to 104*d* are sequentially disposed around four image holders 101*a* to 101*d* formed of an electrophotographic photoreceptor in a rotation direction of the image holder. A static eliminator may be provided for removing the residual potential remaining on surfaces of the image holders 101*a* to 101*d* after transfer.

In addition, an intermediate transfer belt 107 is stretched by tension rollers 106*a* to 106*d*, a drive roller 111, and a backup roller 108 to form an annular body stretching device (belt stretching device) 107*b*. By the tension rollers 106*a* to 106*d*, the drive roller 111, and the backup roller 108, the intermediate transfer belt 107 can move the image holders 101*a* to 101*d* and the primary transfer rollers 105*a* to 105*d* in a direction of arrow A while being in contact with the surfaces of the image holders 101*a* to 101*d*. Portions where the primary transfer rollers 105*a* to 105*d* are in contact with the image holders 101*a* to 101*d* through the intermediate transfer belt 107 are primary transfer portions, and a primary transfer voltage is applied to the contact portions between the image holders 101*a* to 101*d* and the primary transfer rollers 105*a* to 105*d*.

In addition, in the secondary transfer device, the backup roller 108 and a secondary transfer roller 109 are disposed to face each other through the intermediate transfer belt 107 and a secondary transfer belt 116. A recording medium 115 such as paper moves in a region sandwiched between the intermediate transfer belt 107 and the secondary transfer roller 109 in a direction of arrow B while being in contact with the surface of the intermediate transfer belt 107, and subsequently passes through a fixing device 110. A portion where the secondary transfer roller 109 is in contact with the backup roller 108 through the intermediate transfer belt 107 and the secondary transfer belt 116 is a secondary transfer portion, and a secondary transfer voltage is applied to the contact portion between the secondary transfer roller 109 and the backup roller 108. Further, intermediate transfer belt cleaning devices 112 and 113 are disposed in contact with the intermediate transfer belt 107 after transfer.

In the full-color image forming apparatus 100 having the above configuration, the image holder 101*a* rotates in a direction of arrow C, and the surface thereof is charged by the charging device 102*a*. Next, an electrostatic latent image of a first color is formed by the exposure device 114*a* that emits laser light or the like. By the developing device 103*a* containing a toner corresponding to the color, the formed electrostatic latent image is developed (visualized) with the toner to form a toner image. The developing devices 103*a* to 103*d* contain toners (for example, yellow, magenta, cyan, and black) corresponding to the electrostatic latent images of the colors, respectively. While passing through the primary transfer portion, the toner image formed on the image holder 101*a* is electrostatically transferred (primarily transferred) to the intermediate transfer belt 107 by the primary transfer roller 105*a*. Subsequently, toner images of a second color, a third color, and a fourth color are primarily transferred by the primary transfer rolls 105*b* to 105*d* to the intermediate transfer belt 107 on which the toner image of the first color is held, and are sequentially superimposed on the intermediate transfer belt 107. Finally, a full-color multiple toner image is obtained. While passing through the secondary transfer portion, the multiple toner image formed on the intermediate transfer belt 107 is collectively electrostatically transferred to the recording medium 115. The recording medium 115 to which the toner image is transferred is transported to the fixing device 110, the toner image is fixed by heating and/or pressurization, and then the recording medium 115 is discharged to the outside of the apparatus. The residual toners are removed from the image holders 101*a* to 101*d* after the primary transfer by the image holder cleaning devices 104*a* to 104*d*. Meanwhile, the residual toners are removed from the intermediate transfer belt 107 after the secondary transfer by the intermediate transfer belt cleaning devices 112 and 113, and the image forming apparatus is prepared for the next image forming process.

Image Holder

As the image holders 101*a* to 101*d*, well-known electrophotographic photoreceptors are widely applied. As the electrophotographic photoreceptor, for example, an inorganic photoreceptor where a photosensitive layer is formed of an inorganic material or an organic photoreceptor where a photosensitive layer is formed of an organic material is used. As the organic photoreceptor, a function-separated organic photoreceptor in which a charge generation layer that generates charges by exposure and a charge transport layer that transports the charges are laminated, or a monolayer organic photoreceptor having a function of generating charges and a function of transporting the charges is used. In addition, as the inorganic photoreceptor, an inorganic photoreceptor where a photosensitive layer is formed of amorphous silicon is used.

In addition, the shape of the image holder is not particularly limited, and a well-known shape such as a cylindrical drum shape, a sheet shape, or a plate shape is adopted.

Charging Device

The charging devices 102*a* to 102*d* are not particularly limited. For example, well-known chargers are widely applied, the chargers including: a contact charger using a roller, a brush, a film, a rubber blade, or the like that is conductive (here, "conductive" in the charging device represents that the volume resistivity is less than $10^7$ Ω·cm) or semi-conductive (here, "semi-conductive" in the charging device represents that the volume resistivity is $10^7$ to $10^{13}$ Ω·cm); and a scorotron or corotron charger using corona discharge. Among these, for example, a contact charger is preferable. The charging devices 102*a* to 102*d* typically apply a direct current to the image holders 101*a* to 101*d*, but may further superimpose an alternating current on a direct current and apply the superimposed current to the image holders 101*a* to 101*d*.

Exposure Device

The exposure devices 114*a* to 114*d* are not particularly limited. For example, well-known exposure devices are widely applied, the exposure devices including: a light source that emits semiconductor laser light, a light emitting diode (LED) light, liquid crystal shutter light, or the like to the surfaces of the image holders 101*a* to 101*d* or an optical instrument that can expose the surfaces of the image holders 101*a* to 101*d* in a predetermined image pattern from these light sources through a polygonal mirror.

Developing Device

The developing devices 103*a* to 103*d* are selected according to the purpose. Examples of the developing device include a well-known developing unit that performs developing with a one-component developer or a two-component developer in a contact manner using a brush, a roller, or the like or in a non-contact manner.

The toner (developer) used in the image forming apparatus 100 is not particularly limited and is configured to include, for example, a binder resin and a colorant.

Examples of the binder resin include a homopolymer and a copolymer of styrenes, monoolefins, vinyl esters, α-methylene aliphatic monocarboxylic acid esters, vinyl ethers, vinyl ketones, and the like. Particularly, representative examples of the binder resin include polystyrene, a styrene-alkyl acrylate copolymer, a styrene-alkyl methacrylate copolymer, a styrene-acrylonitrile copolymer, a styrene-butadiene copolymer, a styrene-maleic anhydride copolymer, polyethylene, and polypropylene. Examples also include polyester, polyurethane, an epoxy resin, a silicone resin, polyamide, modified rosin, and paraffin wax.

Representative examples of the colorant include magnetic powder such as magnetite or ferrite, carbon black, aniline blue, calcoyl blue, chrome yellow, ultramarine blue, dupont oil red, quinoline yellow, methylene blue chloride, phthalocyanine blue, malachite green oxalate, lamp black, Rose Bengal, C.I. Pigment Red 48:1, C.I. Pigment Red 122, C.I. Pigment Red 57:1, C.I. Pigment Yellow 97, C.I. Pigment Yellow 17, C.I. Pigment Blue 15:1, and C.I. Pigment Blue 15:3.

Well-known additives such as a charge control agent, a release agent, or other inorganic particles may be internally or externally added to the toner.

Representative examples of the release agent include low-molecular-weight polyethylene, low-molecular-weight polypropylene, Fischer-Tropsch wax, montan wax, carnauba wax, rice wax, and candelilla wax.

As the charge control agent, well-known charge control agents such as an azo-based metal complex compound, a metal complex compound of salicylic acid, or a resin-type charge control agent having a polar group are used.

As other inorganic particles, for the purpose of powder fluidity, charge control, and the like, small-diameter inorganic particles having an average primary particle diameter of 40 nm or less are used, and inorganic or organic particles having a larger diameter than the small-diameter inorganic particles may be further used in combination in order to reduce adhesion. Well-known inorganic particles are used as these other inorganic particles.

In addition, the small-diameter inorganic particles are effective because, by performing a surface treatment on the small-diameter inorganic particles, the dispersibility is improved and the effect of improving powder fluidity is improved.

As a method of manufacturing the toner, for example, a polymerization method such as an emulsion polymerization aggregation method or a dissolution suspension method is preferably used because high shape controllability can be obtained. Further, a manufacturing method of using the toner obtained using the above-described method as a core, attaching aggregated particles to the core, and heating and coalescing the core and the aggregated particles to obtain a core-shell structure may be performed.

In a case where an external additive is added, the toner can be manufactured by mixing the toner and the external additive using a Henschel mixer, a V-blender, or the like. Further, in a case where the toner is manufactured through a wet process, the external additive may be externally added to the toner through a wet process.

Primary Transfer Roller

The primary transfer rollers 105*a* to 105*d* may have any of a monolayer structure or a multilayer structure. For example, in the monolayer structure, the primary transfer roller is configured of a roller in which an appropriate amount of conductive particles such as carbon black are mixed in foamed or non-foamed silicone rubber, urethane rubber, ethylene-propylene-diene rubber (EPDM), or the like.

Image Holder Cleaning Device

The image holder cleaning devices 104*a* to 104*d* are provided to remove the residual toner attached to the surfaces of the image holders 101*a* to 101*d* after the primary transfer step, and a cleaning blade, brush cleaning, roller cleaning, or the like is used. Among these, for example, the cleaning blade is preferably used. In addition, examples of a material of the cleaning blade include urethane rubber, neoprene rubber, and silicone rubber.

Secondary Transfer Roller

The layer structure of the secondary transfer roller 109 is not particularly limited. For example, a three-layer structure is configured of a core layer, an interlayer, and a coating layer that coats surfaces thereof. The core layer is formed of a foamed body of silicone rubber, urethane rubber, EPDM, or the like in which conductive particles are dispersed, and the interlayer is formed of a non-foamed body thereof. Examples of a material of the coating layer include a tetrafluoroethylene-hexafluoropropylene copolymer, and a perfluoroalkoxy resin. The volume resistivity of the secondary transfer roller 109 is, for example, preferably $10^7$ Ωcm or less. In addition, a two-layer structure excluding the interlayer may be adopted.

Backup Roller

The backup roller 108 forms a counter electrode of the secondary transfer roller 109. The layer structure of the backup roller 108 may have any of a monolayer structure or a multilayer structure. For example, in the monolayer structure, the backup roller 108 is configured of a roller in which an appropriate amount of conductive particles such as carbon black are mixed in silicone rubber, urethane rubber, EPDM, or the like. In a two-layer structure, the backup roller 108 is configured of a roller in which an outer peripheral surface of an elastic layer formed of the above-described rubber material is coated with a high-resistivity layer.

In addition, for example, a voltage of preferably 1 kV or higher and 6 kV or lower is applied to a shaft of the backup roller 108 and the secondary transfer roller 109. Instead of applying the voltage to the shaft of the backup roller 108, a voltage may be applied to an electrically conductive electrode member in contact with the backup roller 108 and the secondary transfer roller 109. Examples of the electrode member include a metal roller, a conductive rubber roller, a conductive brush, a metal plate, and a conductive resin plate.

Fixing Device

As the fixing device 110, for example, a well-known fixing unit such as a heat roller fixing unit, a pressure roller fixing unit, or a flash fixing unit is widely applied.

Intermediate Transfer Belt Cleaning Device

As the intermediate transfer belt cleaning devices 112 and 113, a cleaning blade, brush cleaning, roller cleaning, or the like is used. Among these, for example, the cleaning blade is preferably used. In addition, examples of a material of the cleaning blade include urethane rubber, neoprene rubber, and silicone rubber.

In the above exemplary embodiments, the so-called tandem-type image forming apparatus configured with a plurality of image holders has been described. However, a so-called multicycle-type (for example, 4-cycle type) image forming apparatus may be used where one image holder is provided and an intermediate transfer belt rotates and performs image forming process in cycles corresponding to the number of colors.

Hereinabove, the present exemplary embodiment has been described. However, the present exemplary embodiment is not limited to the above exemplary embodiments, and various modifications, changes, and ameliorations can be made.

EXAMPLES

Hereinafter, examples of the present invention will be described, but the present invention is not limited to these examples. In the following description, unless specified otherwise, "part(s)" and "%" represent "part(s) by mass" and "mass %".

Example 1

30 phr of carbon black (Monark 880 (M880), manufactured by Cabot Corporation; average primary particle diameter: 16 nm) and 15 phr of silicone particles (silicone particles including a core portion and a shell portion, in which the core portion includes a silicone resin not having a three-dimensional crosslinked structure and the shell portion coats the core portion and includes a silicone resin having a three-dimensional crosslinked structure; KMP600 manufactured by Shin-Etsu Chemical Co., Ltd.; average primary particle diameter: 5 μm) are melt-kneaded with a thermoplastic resin (polybutylene terephthalate (PBT), NOVADURAN manufactured by Mitsubishi Chemical Corporation) using a twin-screw melt kneader (manufactured by Parker Corporation). During the melt-kneading, a barrel at the most downstream position (material supply side) is 170° C. and a barrel heating temperature is set stepwise from the most downstream position such that the maximum heating temperature is 240° C., and a screw rotation torque is 120 N·m. Molten strand (rope shape having a diameter of about 2 mm) discharged from a discharge port of the kneader is cooled in a water tank, and the cooled and solidified strand is inserted into a pelletizer and cut to obtain a kneaded resin pellet having a cut length of about 5 mm. "phr" represents part(s) by mass of each of the materials used in a case where the content of the binder resin such as polyester is set to 100 parts by mass.

After the melt-kneading, the kneaded resin pellet is heated to 225° using a single-screw melt extruder (manufactured by Mitsuba MFG. Co., Ltd.) is melt-extruded while being collected (drawn) by a collecting device. Next, an inner peripheral surface of the cylindrical molten resin is brought into contact with a surface (surface temperature: 25° C.) of a cylindrical sizing die having a diameter of φ278 mm, and an outer peripheral surface of the molten resin is blown with air (25° C.) to be cooled. This film is collected in a cylindrical shape and is cut by a cutter to obtain a transfer belt having a diameter of φ277.9 mm and a width of 350 mm. In the obtained transfer belt, the film thickness is 120 μm, and the surface resistivity is 10.2 log Ω/□. A film sample for evaluating physical properties is cut from the transfer belt, the hygroscopic expansion coefficient is measured, and image evaluation after long-term image formation is performed.

Examples 2 to 7 and Comparative Examples 1 and 2

Transfer belts are prepared using the same method as the method of Example 1, except that the kind and the amount of each of the materials are changed as shown in Table 1.

Using the obtained transfer belt, the following evaluation is performed. The evaluation results are collectively shown in Table 2.

Surface Resistivity

Regarding the surface resistivity of the transfer belt, by using a microammeter (R8430A manufactured by ADVANTEST CORPORATION) as a resistance meter and a UR probe (manufactured by Mitsubishi Chemical Analytech Co., Ltd.) as a probe, the surface resistivity (log Ω/sq.) of the outer peripheral surface of the endless belt is measured at 18 points in total including 6 points at regular intervals in the peripheral direction and 3 points at each of the center portion and both end portions in the width direction at a voltage of 500 V under a pressure of 1 kgf for an application time of 3 seconds, and the average value thereof is calculated. The surface resistivity is measured in an environment of a temperature of 22° C. and a humidity of 55% RH.

Surface Contact Angle

By using DMs-401 (manufactured by Kyowa Interface Science Co., Ltd.) as a contact angle meter and using pure water as a dripping solvent, the surface contact angle of the transfer belt is measured (temperature: 22° C., humidity: 55%) at 10 points in total including 2 points in a peripheral direction and 5 points in an axis direction on the transfer belt surface, and the average value thereof is calculated.

The water contact angle relates to toner releasability relating to contamination, and as the value becomes higher, the releasability is improved, and the formation of white spot images caused by belt surface contamination is not likely to occur.

Surface Roughness

By using SURFCOM (manufactured by Tokyo Seimitsu Co., Ltd.) as a surface roughness meter, the surface roughness of the transfer belt is measured (temperature: 22° C., humidity: 55%) at 10 points in total including 2 points in a peripheral direction and 5 points in an axis direction on the transfer belt surface, and the average value thereof is calculated.

The surface roughness relates to contamination or abrasion of the belt surface, and as the value decreases, the contact area decreases, and the formation of white spot images caused by contamination or abrasion is not likely to occur.

Evaluation of Transfer Belt Properties

Regarding the dimension stability of the transfer belt, by checking the amount of change in dimensions under conditions of a 25.4 mm×149 mm specimen, a load of 230 g, and repetition of [35° C./85% RH, 24 hr]⇔[35° C./20% RH, 24 hr], deformation of the transfer belt (in the table hygroscopic expansion coefficient) caused by the humidity is evaluated. In addition, the surface resistivity, the contact angle, and the surface roughness of the transfer belt are also evaluated.

The hygroscopic expansion coefficient relates to the stability of resistance/surface contamination, and as the value decreases, the formation of white spot images caused by resistance variation or surface shape change due to moisture absorption is not likely to occur.

Evaluation of White Spot Images

In a high temperature and high humidity environment of 30° C./85% RH, after continuously transferring 3,000 A4 sheets of paper using a modified evaluation device of Docu Print C2250 (manufactured by FUJIFILM Business Innovation Corp.), a halftone (magenta 30%) image is transferred to an A3 sheet of paper. In this case, a secondary transfer voltage is 5.5 kV. Using the obtained halftone image, the formation of white spot images is determined by visual inspection based on the following evaluation standards.

A: No white spots are observed

B: A small amount of white spots are observed

C: White spots are observed

D: A large amount of white spots are observed

Evaluation of Contamination State of Transfer Belt Surface

During the evaluation of the white spot images, the adhesion state (filming) of the toner or the paper powder to the transfer belt surface is observed to check the contamination state of the transfer belt surface.

A: No contamination is observed

B: A small amount of contamination is observed

C: Contamination is observed

D: A large amount of contamination is observed

Evaluation of Abrasion State of Transfer Belt Surface

During the evaluation of the white spot images, the unevenness of the belt surface is observed to check the abrasion state of the transfer belt surface.

A: Substantially no abrasion is observed

B: A small amount of abrasion is observed

C: Abrasion is observed

D: A large amount of abrasion is observed

Evaluation of Resistance Stability

After the evaluation of the white spot images, the surface resistivity (in the table, shown as "Surface Resistivity after Long-Term Image Formation") of the transfer belt is measured.

By comparing the surface resistivity to the surface resistivity of the transfer belt before the image formation, the amount of change between the surface resistivity at the initial stage and the surface resistivity after the image formation (in the table, shown as "Amount of Variation in Resistance Stability from Initial Stage to Long-Term Use") is calculated. Regarding the amount of variation, for example, the numerical value is preferably small.

TABLE 1

| | Material Composition | | | | | | | Evaluation Item | | |
|---|---|---|---|---|---|---|---|---|---|---|
| | | Silicone Particles | | | Carbon Black | | | | | |
| | Resin | Name | Average Primary Particle Diameter | Mixing Amount | Name | Average Primary Particle Diameter | Mixing Amount | Surface Resistivity (logΩ/□) | Water Contact Angle (°) | Hygroscopic Expansion Coefficient (ppm) |
| Example 1 | PBT | KMP600 | 5 μm | 13 phr | M880 | 16 nm | 30 phr | 10.2 | 100 | 16 |
| Example 2 | PBT | KMP600 | 5 μm | 2 phr | M880 | 16 nm | 26 phr | 12.6 | 91 | 22 |
| Example 3 | PBT | KMP600 | 5 μm | 25 phr | M880 | 16 nm | 34 phr | 9.3 | 108 | 12 |
| Example 4 | PBT | KMP601 | 15 μm | 15 phr | M880 | 16 nm | 30 phr | 9.7 | 101 | 20 |

TABLE 1-continued

| | | | | | | | | | | |
|---|---|---|---|---|---|---|---|---|---|---|
| Example 5 | PBT | KMP602 | 35 μm | 15 phr | M880 | 16 nm | 30 phr | 10.9 | 105 | 25 |
| Example 6 | PBT | KMP600 | 5 μm | 15 phr | REGAL 350 | 48 nm | 30 phr | 10.6 | 101 | 18 |
| Example 7 | PEN | KMP600 | 5 μm | 10 phr | M880 | 16 nm | 25 phr | 11.9 | 101 | 17 |
| Comparative Example 1 | PA | | — | — | M880 | 16 nm | 30 phr | 11.1 | 80 | 51 |
| Comparative Example 2 | PBT | | — | — | M880 | 16 nm | 30 phr | 10.2 | 82 | 38 |

| | Evaluation Item | | | | | |
|---|---|---|---|---|---|---|
| | Surface Roughness Rz (μm) | Evaluation of Contamination State of Transfer Belt Surface | Evaluation of Abrasion State of Transfer Belt Surface | Resistance Stability (Surface Resistivity after Long-Term Image Formation) (logΩ/□) | Amount of Variation in Resistance Stability Initial Stage to Long-Term Use (logΩ/□) | Evaluation of White Spot Images |
| Example 1 | 0.18 | A | A | 10.1 | 0.1 | A |
| Example 2 | 0.21 | A | A | 12.2 | 0.4 | A |
| Example 3 | 0.13 | A | A | 9.2 | 0.1 | A |
| Example 4 | 0.31 | B | A | 9.6 | 0.1 | A |
| Example 5 | 0.44 | B | B | 10.7 | 0.2 | B |
| Example 6 | 0.39 | A | A | 10 | 0.6 | B |
| Example 7 | 0.18 | B | B | 11.1 | 0.8 | B |
| Comparative Example 1 | 0.22 | D | D | 9.8 | 1.3 | D |
| Comparative Example 2 | 0.17 | C | C | 9.1 | 1.1 | D |

The details of abbreviations in Table 1 other than the above described abbreviations are as follows.

PBT: polybutylene terephthalate (NOVADURAN manufactured by Mitsubishi Chemical Corporation)

PA: polyamide resin ("6434 polyamide", manufactured by Ube Corporation)

PEN: polyethylene naphthalate resin

KMP600: silicone particles (silicone particles including a core portion and a shell portion, in which the core portion includes a silicone resin not having a three-dimensional crosslinked structure and the shell portion coats the core portion and includes a silicone resin having a three-dimensional crosslinked structure; KMP600 manufactured by Shin-Etsu Chemical Co., Ltd.; average primary particle diameter: 5 μm)

KMP601: silicone particles (silicone particles including a core portion and a shell portion, in which the core portion includes a silicone resin not having a three-dimensional crosslinked structure and the shell portion coats the core portion and includes a silicone resin having a three-dimensional crosslinked structure; KMP601 manufactured by Shin-Etsu Chemical Co., Ltd.; average primary particle diameter: 15 μm)

KMP602: silicone particles (silicone particles including a core portion and a shell portion, in which the core portion includes a silicone resin not having a three-dimensional crosslinked structure and the shell portion coats the core portion and includes a silicone resin having a three-dimensional crosslinked structure; KMP602 manufactured by Shin-Etsu Chemical Co., Ltd.; average primary particle diameter: 35 μm)

M880: carbon black ("Monark 880", manufactured by Cabot Corporation; average primary particle diameter: 16 nm)

REGAL 350: carbon black ("REGAL 350", manufactured by Orion Engineered Carbons S.A., average primary particle diameter: 48 nm)

It can be seen from the results shown in Table 2 that, in the transfer belts according to Examples, the formation of white spots is suppressed in an image that is formed after continuously forming images as compared to the transfer belts according to Comparative Examples.

(((1)))

A transfer belt comprising:

a substrate layer that includes polyester, silicone particles, and conductive particles.

(((2)))

The transfer belt according to (((1))), wherein the polyester is polyester including an aromatic group.

(((3)))

The transfer belt according to (((2))), wherein the polyester including an aromatic group is polybutylene terephthalate.

(((4)))

The transfer belt according to any one of (((1))) to (((3))), wherein the silicone particles include a core portion and a shell portion, in which the core portion includes a silicone resin not having a three-dimensional cross-linked structure and the shell portion coats the core portion and includes a silicone resin having a three-dimensional crosslinked structure.

(((5)))

The transfer belt according to any one of (((1))) to (((4))), wherein the conductive particles are particles of a carbon material.

(((6)))

The transfer belt according to any one of (((1))) to (((5))), wherein a mass ratio Mc/Ms of a content Mc of the conductive particles to a content Ms of the silicone particles is 0.5 or more and 30 or less.

(((7)))

The transfer belt according to any one of (((1))) to (((6))), wherein in a case where a content of the polyester is set to 100 parts by mass, a content of the silicone particles is 1 part by mass or more and 30 parts by mass or less, and a content of the conductive particles is 15 parts by mass or more and 30 parts by mass or less.

(((8)))

A transfer device comprising:

an intermediate transfer belt that includes the transfer belt according to any one of (((1))) to (((7)));

a primary transfer device that primarily transfers a toner image formed on a surface of an image holder to an outer peripheral surface of the intermediate transfer belt; and a secondary transfer device that secondarily transfers the toner image transferred to the outer peripheral surface of the intermediate transfer belt to a recording medium.

(((9)))

An image forming apparatus comprising:

the transfer device according to (((8))).

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A transfer belt comprising, a substrate layer that includes polyester, silicone particles, and conductive particles, wherein the silicone particles include a core portion and a shell portion, in which the core portion includes a silicone resin not having a three-dimensional cross-linked structure and the shell portion coats the core portion and includes a silicone resin having a three-dimensional crosslinked structure.

2. The transfer belt according to claim 1, wherein the polyester is polyester including an aromatic group.

3. The transfer belt according to claim 2, wherein the polyester including an aromatic group is polybutylene terephthalate.

4. The transfer belt according to claim 1, wherein the conductive particles are particles of a carbon material.

5. A transfer belt comprising, a substrate layer that includes polyester, silicone particles, and conductive particles, wherein a mass ratio Mc/Ms of a content Mc of the conductive particles to a content Ms of the silicone particles is 0.5 or more and 30 or less.

6. The transfer belt according to claim 1, wherein in a case where a content of the polyester is set to 100 parts by mass, a content of the silicone particles is 1 part by mass or more and 30 parts by mass or less, and a content of the conductive particles is 15 parts by mass or more and 40 parts by mass or less.

7. A transfer device comprising:

an intermediate transfer belt that includes the transfer belt according to claim 2;

a primary transfer device that primarily transfers a toner image formed on a surface of an image holder to an outer peripheral surface of the intermediate transfer belt; and a secondary transfer device that secondarily transfers the toner image transferred to the outer peripheral surface of the intermediate transfer belt to a recording medium.

8. A transfer device comprising:

an intermediate transfer belt that includes the transfer belt according to claim 3;

a primary transfer device that primarily transfers a toner image formed on a surface of an image holder to an outer peripheral surface of the intermediate transfer belt; and a secondary transfer device that secondarily transfers the toner image transferred to the outer peripheral surface of the intermediate transfer belt to a recording medium.

9. A transfer device comprising:

an intermediate transfer belt that includes the transfer belt according to claim 1;

a primary transfer device that primarily transfers a toner image formed on a surface of an image holder to an outer peripheral surface of the intermediate transfer belt; and a secondary transfer device that secondarily transfers the toner image transferred to the outer peripheral surface of the intermediate transfer belt to a recording medium.

10. A transfer device comprising:

an intermediate transfer belt that includes the transfer belt according to claim 4;

a primary transfer device that primarily transfers a toner image formed on a surface of an image holder to an outer peripheral surface of the intermediate transfer belt; and a secondary transfer device that secondarily transfers the toner image transferred to the outer peripheral surface of the intermediate transfer belt to a recording medium.

11. A transfer device comprising:

an intermediate transfer belt that includes the transfer belt according to claim 5;

a primary transfer device that primarily transfers a toner image formed on a surface of an image holder to an outer peripheral surface of the intermediate transfer belt; and a secondary transfer device that secondarily transfers the toner image transferred to the outer peripheral surface of the intermediate transfer belt to a recording medium.

12. A transfer device comprising:

an intermediate transfer belt that includes the transfer belt according to claim 6;

a primary transfer device that primarily transfers a toner image formed on a surface of an image holder to an outer peripheral surface of the intermediate transfer belt; and a secondary transfer device that secondarily transfers the toner image transferred to the outer peripheral surface of the intermediate transfer belt to a recording medium.

13. An image forming apparatus comprising:

the transfer device according to claim 7.

14. An image forming apparatus comprising:

the transfer device according to claim 8.

15. An image forming apparatus comprising:

the transfer device according to claim 9.

16. An image forming apparatus comprising:

the transfer device according to claim 10.

17. An image forming apparatus comprising:
the transfer device according to claim 11.

* * * * *